(12) United States Patent
Suzuki et al.

(10) Patent No.: US 12,000,466 B2
(45) Date of Patent: Jun. 4, 2024

(54) VEHICLE CONTROL APPARATUS

(71) Applicant: SUBARU CORPORATION, Tokyo (JP)

(72) Inventors: Yuuki Suzuki, Tokyo (JP); Tomoka Yoshikawa, Tokyo (JP); Kazuki Kodaira, Tokyo (JP); Satoru Kudo, Tokyo (JP); Hiroki Senda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/451,300

(22) Filed: Aug. 17, 2023

(65) Prior Publication Data

US 2024/0093769 A1    Mar. 21, 2024

(30) Foreign Application Priority Data

Sep. 16, 2022  (JP) .................. 2022-148123

(51) Int. Cl.
*F16H 45/02* (2006.01)
(52) U.S. Cl.
CPC ..... *F16H 45/02* (2013.01); *F16H 2045/0226* (2013.01); *F16H 2045/0294* (2013.01)
(58) Field of Classification Search
CPC ......... B60W 10/024–026; B60W 10/06; F16H 45/02–2045/0294
See application file for complete search history.

(56) References Cited

U.S. PATENT DOCUMENTS

2011/0071742 A1    3/2011  Inuta et al.
2018/0244276 A1*   8/2018  Imamura ............... B60W 30/20

FOREIGN PATENT DOCUMENTS

| JP | 2011-64291 A | 3/2011 |
| JP | 2015-113904 A | 6/2015 |
| JP | 2019-44903 A | 3/2019 |

* cited by examiner

*Primary Examiner* — David R Morris
(74) *Attorney, Agent, or Firm* — Rimon P.C.

(57) ABSTRACT

A vehicle control apparatus is to be applied to a vehicle including a torque converter and an engine. The vehicle control apparatus includes a turbine hub, a lock-up piston, a damper mechanism, and a control system. The damper mechanism permits relative rotation between a hub of the turbine hub and a cylindrical part of the lock-up piston. The control system controls the engine. The control system calculates, with the lock-up piston engaged with a crankshaft of the engine, a PV value that is a product of a sliding surface pressure and a sliding speed between the hub and the cylindrical part. When the PV value is greater than a threshold, the control system changes an engine torque more gradually than when the PV value is equal to or less than the threshold. The engine torque is an output torque of the crankshaft.

10 Claims, 16 Drawing Sheets

[ CONTROL EXAMPLE 1 ]

[ CONTROL EXAMPLE 2 ]

[ CONTROL EXAMPLE 3 ]

VEHICLE CONTROL APPARATUS

CROSS-REFERENCE TO RELATED APPLICATIONS

The present application claims priority from Japanese Patent Application No. 2022-148123 filed on Sep. 16, 2022, the entire contents of which are hereby incorporated by reference.

BACKGROUND

The disclosure relates to a vehicle control apparatus to be applied to a vehicle.

A power train to be mounted in a vehicle includes an engine and a torque converter coupled to the engine. The torque converter includes a lock-up clutch that directly couples a crankshaft on an input side and a turbine shaft on an output side. The torque converter further includes a damper mechanism that permits relative rotation between the crankshaft and the turbine shaft in a state in which the lock-up clutch is engaged, i.e., the damper mechanism that permits relative rotation between a lock-up piston and a turbine hub. For example, reference is made to Japanese Unexamined Patent Application Publication (JP-A) Nos. 2015-113904, 2011-64291, and 2019-44903.

SUMMARY

An aspect of the disclosure provides a vehicle control apparatus to be applied to a vehicle. The vehicle includes a torque converter and an engine. The torque converter includes a turbine runner and a turbine shaft. The engine includes a crankshaft coupled to the torque converter. The vehicle control apparatus includes a turbine hub, a lock-up piston, a damper mechanism, and a control system. The turbine hub includes a flange and a hub. The flange is coupled to the turbine runner. The hub is coupled to the turbine shaft. The lock-up piston includes a cylindrical part and a disc part. The cylindrical part is slidably supported by an outer circumferential surface of the hub. The disc part extends from the cylindrical part outward in a radial direction of the cylindrical part. The damper mechanism is coupled to both the turbine hub and the lock-up piston, and configured to permit relative rotation between the hub and the cylindrical part. The control system includes a processor and a memory that are communicably coupled to each other. The control system is configured to control the engine. The control system is configured to: calculate, in a state in which the lock-up piston is engaged with the crankshaft of the engine, a PV value that is a product of a sliding surface pressure and a sliding speed between the hub and the cylindrical part; and when the PV value is greater than a threshold, change an engine torque more gradually than when the PV value is equal to or less than the threshold. The engine torque is an output torque of the crankshaft.

An aspect of the disclosure provides a vehicle control apparatus to be applied to a vehicle. The vehicle includes a torque converter and an engine. The torque converter includes a turbine runner and a turbine shaft. The engine includes a crankshaft coupled to the torque converter. The vehicle control apparatus includes a turbine hub, a lock-up piston, a damper mechanism, and circuitry. The turbine hub includes a flange and a hub. The flange is coupled to the turbine runner. The hub is coupled to the turbine shaft. The lock-up piston includes a cylindrical part and a disc part. The cylindrical part is slidably supported by an outer circumferential surface of the hub. The disc part extends from the cylindrical part outward in a radial direction of the cylindrical part. The damper mechanism is coupled to both the turbine hub and the lock-up piston, and configured to permit relative rotation between the hub and the cylindrical part. The circuitry is configured to control the engine. The circuitry is configured to: calculate, in a state in which the lock-up piston is engaged with the crankshaft of the engine, a PV value that is a product of a sliding surface pressure and a sliding speed between the hub and the cylindrical part; and when the PV value is greater than a threshold, change an engine torque more gradually than when the PV value is equal to or less than the threshold. The engine torque is an output torque of the crankshaft.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
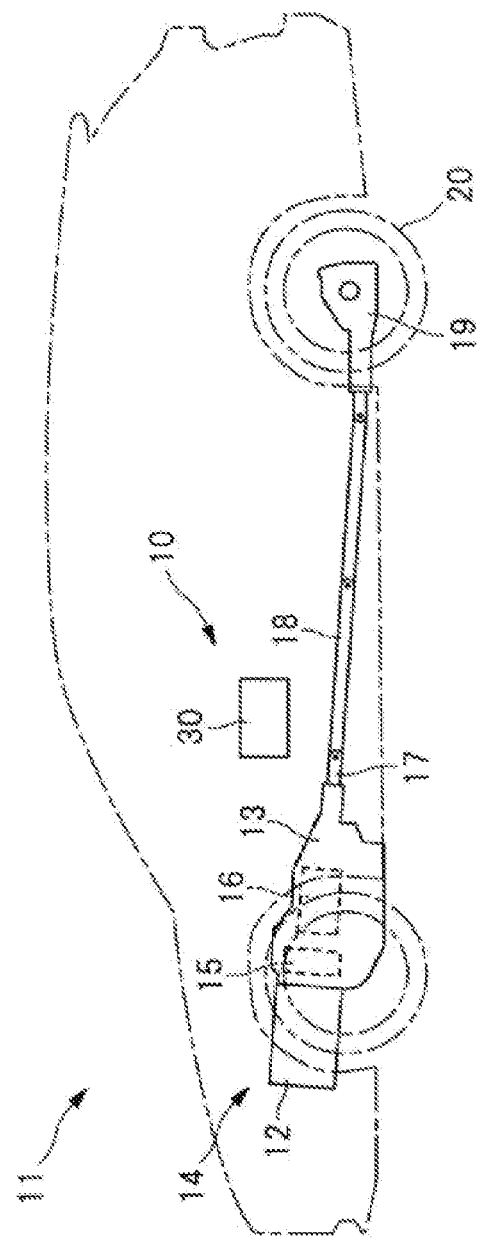
FIG. 1 is a diagram illustrating an example of a vehicle including a vehicle control apparatus according to one example embodiment of the disclosure.

When an engine torque increases or decreases while a lock-up clutch is engaged, a damper mechanism is twisted, and a lock-up piston and a turbine hub relatively rotate. At this time, a contact portion between the lock-up piston and the turbine hub slide with respect to each other, and excessive wear of the contact portion can cause working fluid circulation in a torque converter and increase a workload of an oil pump. In addition, excessive wear of the contact portion between the lock-up piston and the turbine hub can cause poor engagement of the lock-up clutch.

It is desirable to provide a vehicle control apparatus that makes it possible to suppress wear between a lock-up piston and a turbine hub.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[Vehicle]

FIG. 1 is a diagram illustrating an example of a vehicle 11 including a vehicle control apparatus 10 according to an example embodiment of the disclosure. As illustrated in FIG. 1, the vehicle 11 may include a power train 14 including an engine 12 and a transmission 13. The transmission 13 may include a torque converter 15, and a transmission mechanism 16 such as an automatic transmission or a continuously variable transmission. Wheels 20 may be coupled to an output shaft 17 of the transmission 13 via a propeller shaft 18 and a differential mechanism 19. Although the power train 14 may be a rear-wheel drive power train in the example illustrated in FIG. 1, without being limited thereto, the power train 14 may be a front-wheel drive or an all-wheel drive power train.

Figure 2:
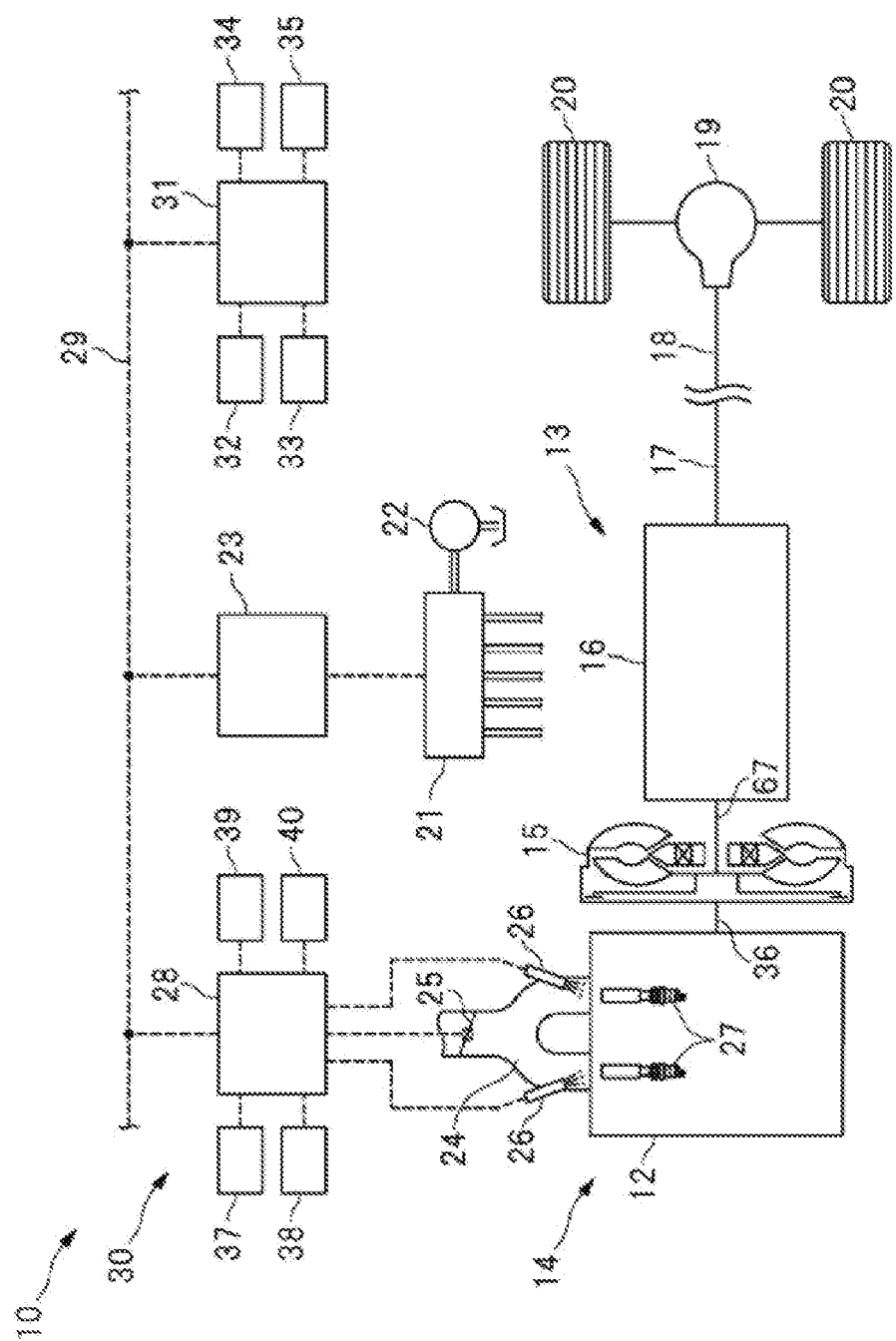
FIG. 2 is a diagram illustrating an example of the vehicle control apparatus.

FIG. 2 is a diagram illustrating an example of the vehicle control apparatus 10. As illustrated in FIG. 2, the power train 14 may include a valve body 21 including, for example, electromagnetic valves and oil paths. The valve body 21 may control devices including, for example, the torque converter 15 and the transmission mechanism 16 in the power train 14. In addition, an oil pump 22 to be driven by the engine 12 may be coupled to the valve body 21. A working fluid pumped from the oil pump 22 may be pressure-regulated through the valve body 21 and thereafter supplied to the devices including, for example, the torque converter 15 and the transmission mechanism 16. To control, for example, the torque converter 15 via the valve body 21, a transmission control unit 23 may be coupled to the valve body 21.

The engine 12 may include an intake manifold 24. The intake manifold 24 may include a throttle valve 25. The throttle valve 25 may adjust an intake air amount. The engine 12 may further include injectors 26 and ignition devices 27. The injector 26 may inject a fuel into an intake port or a cylinder. The ignition device 27 may include, for example, an ignitor or an ignition plug. To control an engine torque or an engine speed, an engine control unit 28 may be coupled to devices including, for example, the throttle valve 25, the injectors 26, and the ignition devices 27.

[Control System]

As illustrated in FIG. 2, the vehicle control apparatus 10 includes a control system 30. The control system 30 may control, for example, the power train 14, and may include multiple electronic control units. Examples of the electronic control units in the control system 30 may include the transmission control unit 23 and the engine control unit 28 described above, and may also include a vehicle control unit 31. The vehicle control unit 31 may output a control signal to each of the control units 23 and 28. The control units 23, 28, and 31 may be communicably coupled to each other via an in-vehicle network 29 such as a controller area network (CAN). The vehicle control unit 31 may set operation targets of devices including, for example, the engine 12 and the torque converter 15, based on data received from various control units and various sensors to be described later. Thereafter, the vehicle control unit 31 may generate control signals corresponding to the operation target of the devices including, for example, the engine 12 and the torque converter 15, and output the control signals to the engine control unit 28 and the transmission control unit 23.

Examples of the sensors coupled to the vehicle control unit 31 may include a vehicle speed sensor 32, an accelerator sensor 33, and a brake sensor 34. The vehicle speed sensor 32 may detect a vehicle speed, that is, a traveling speed of the vehicle 11. The accelerator sensor 33 may detect an operation status of an accelerator pedal. The brake sensor 34 may detect an operation status of a brake pedal. In addition, a start switch 35 may be coupled to the vehicle control unit 31. The start switch 35 may be operated by a driver who drives the vehicle 11 to start up the control system 30. Examples of the sensors coupled to the engine control unit 28 may include a crank angle sensor 37, an airflow meter 38, a water temperature sensor 39, and a throttle position sensor 40. The crank angle sensor 37 may detect a rotation angle of a crankshaft 36 of the engine 12. The airflow meter 38 may detect the intake air amount of the engine 12. The water temperature sensor 39 may detect a temperature of cooling water of the engine 12. The throttle position sensor 40 may detect a position of the throttle valve 25. Note that, based on detection signals from various sensors, the engine control unit 28 is able to calculate the engine torque, that is, an output torque of the crankshaft 36, and calculate the engine speed, that is, a rotation speed of the crankshaft 36.

Figure 3:
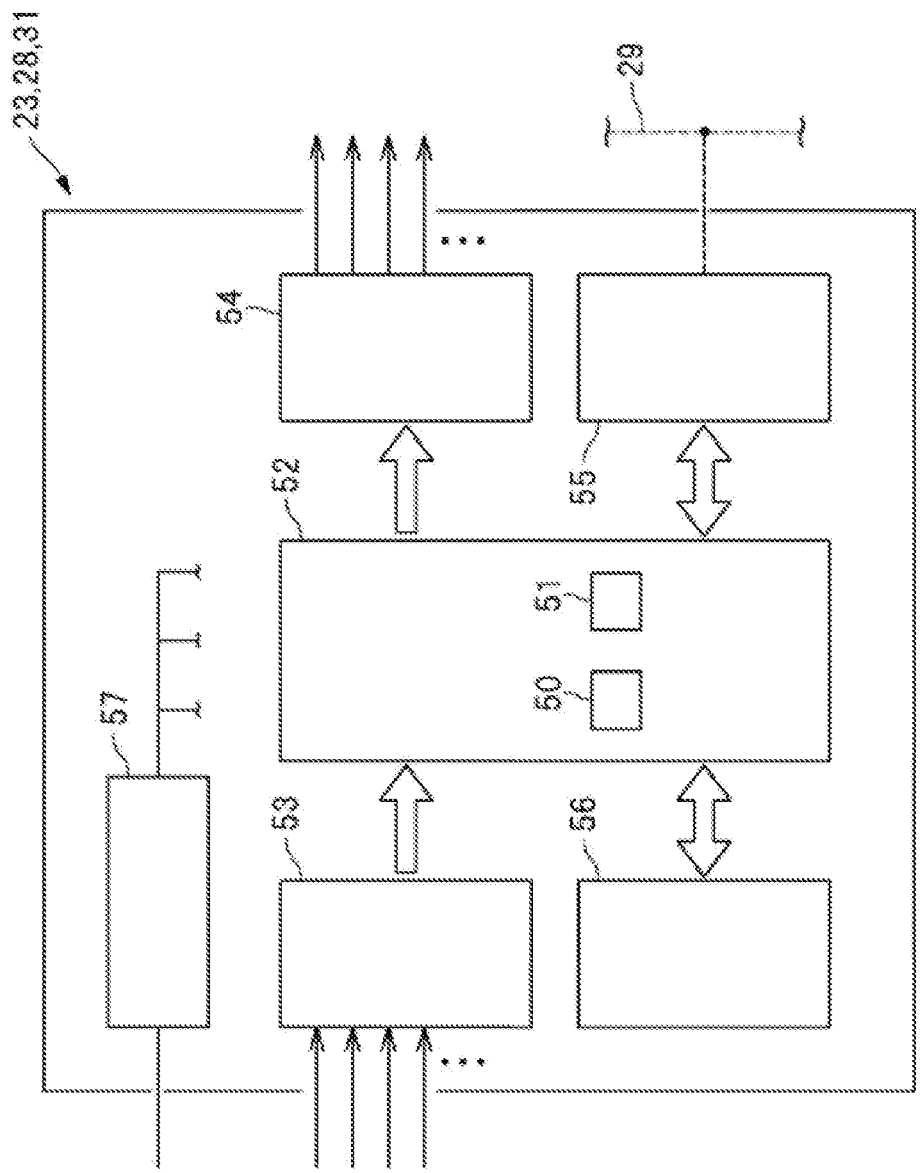
FIG. 3 is a diagram illustrating an example of a basic configuration of control units.

FIG. 3 is a diagram illustrating an example of a basic configuration of the control units 23, 28, and 31. As illustrated in FIG. 3, the control units 23, 28, and 31 serving as electronic control units may each include a microcontroller 52 that includes devices including, for example, a processor 50 and a main memory 51. In one embodiment, the main memory 51 may serve as a "memory". The main memory 51 may hold a predetermined program. The processor 50 may execute the program. The processor 50 and the main memory 51 are communicably coupled to each other. Note that the microcontroller 52 may include multiple processors 50. The microcontroller 52 may include multiple main memories 51.

The control units 23, 28, and 31 may each include devices including, for example, an input circuit 53, a drive circuit 54, a communication circuit 55, an external memory 56, and a power supply circuit 57. The input circuit 53 may convert signals received from various sensors into signals receivable by the microcontroller 52. The drive circuit 54 may generate drive signals for driving various devices including the injectors 26 described above, based on signals outputted from the microcontroller 52. The communication circuit 55 may convert the signals outputted from the microcontroller 52 into communication signals to be transmitted to the other control units. The communication circuit 55 may also convert communication signals received from the other control units into signals receivable by the microcontroller 52. The power supply circuit 57 may supply a stable power supply voltage to each of devices including, for example, the microcontroller 52, the input circuit 53, the drive circuit 54, the communication circuit 55, and the external memory 56. The external memory 56 may include, for example, a nonvolatile memory, and may hold a program and various pieces of data, for example.

[Torque Converter]

Figure 4:
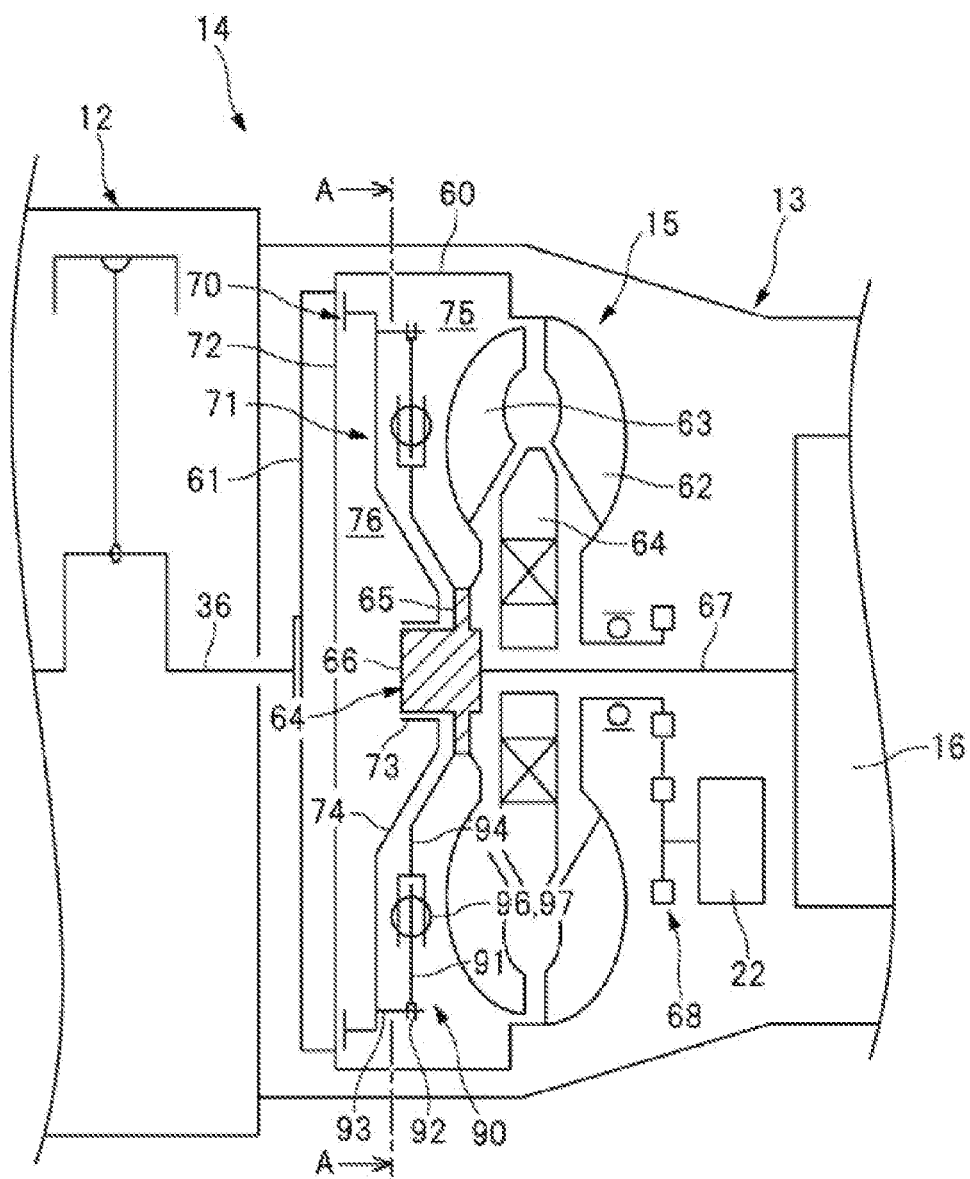
FIG. 4 is a diagram illustrating a torque converter and the vicinity thereof.
Figure 5:
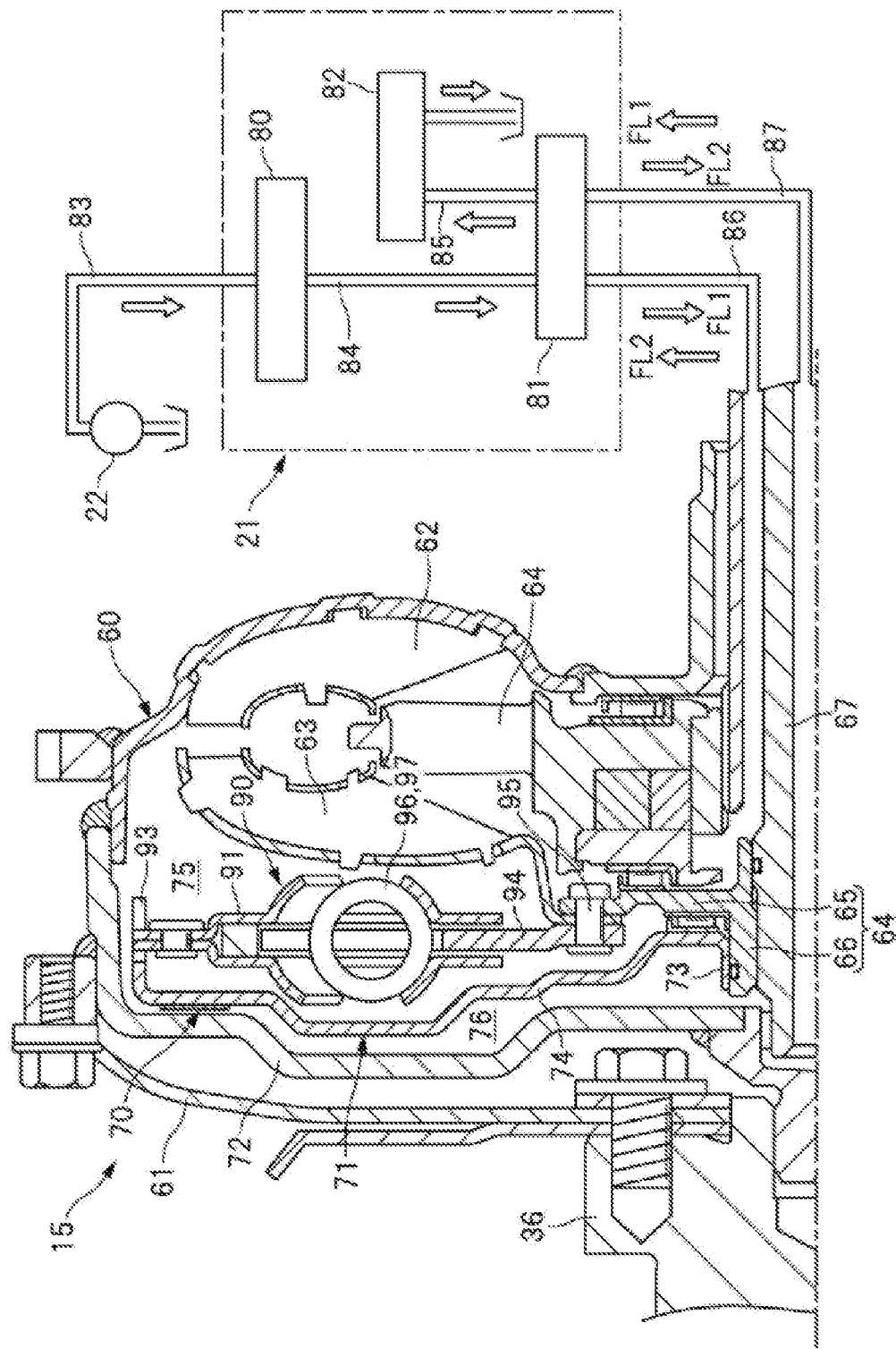
FIG. 5 is a cross-sectional view of the torque converter with a valve body.

FIG. 4 is a diagram illustrating the torque converter 15 and the vicinity thereof. FIG. 5 is a cross-sectional view of the torque converter 15 with the valve body 21. Note that FIG. 5 illustrates a portion of the valve body 21 and a portion of the torque converter 15.

As illustrated in FIGS. 4 and 5, the torque converter 15 may include a pump shell 60 coupled to the engine 12. For example, the pump shell 60 may be coupled to the crankshaft 36 of the engine 12 via a drive plate 61. The torque converter 15 may also include a pump impeller 62 fixed to the pump shell 60, and a turbine runner 63 opposed to the pump impeller 62. To the turbine runner 63 is coupled a flange 65 of a turbine hub 64. A turbine shaft 67 is coupled to a hub 66 of the turbine hub 64. The torque converter 15 may be supplied with the working fluid, and the engine torque may be transmitted via the working fluid from the pump impeller 62 to the turbine runner 63. Note that the transmission mechanism 16 may be coupled to the turbine shaft 67, and the oil pump 22 may be coupled to the pump shell 60 via a chain mechanism 68.

[Lock-Up Clutch]

The torque converter 15 may include a lock-up clutch 70 that directly couples the crankshaft 36 and the turbine shaft 67. The lock-up clutch 70 may include a lock-up piston 71 contained in the pump shell 60. The lock-up piston 71 may be opposed to a front cover 72 of the pump shell 60. The lock-up piston 71 includes a cylindrical part 73 and a disc part 74. The cylindrical part 73 is slidably supported by an outer circumferential surface 66a of the hub 66 of the turbine hub 64. The disc part 74 extends outward in a radial direction from the cylindrical part 73. This lock-up piston 71 may be contained in the pump shell 60 to partition the inside of the pump shell 60 into an apply chamber 75 and a release chamber 76. In other words, the lock-up piston 71 may define, as a boundary, the apply chamber 75 on the turbine runner 63 side and the release chamber 76 on the front cover 72 side.

To supply the working fluid to the apply chamber 75 and the release chamber 76, the valve body 21 described above may be coupled to the torque converter 15. As illustrated in FIG. 5, the valve body 21 may include a clutch pressure control valve 80, a lock-up control valve 81, and a flow rate control valve 82. To the clutch pressure control valve 80 may be coupled an ejection oil path 83 that guides the working fluid ejected from the oil pump 22. To the lock-up control valve 81 may be coupled a supply oil path 84 and a discharge oil path 85. The working fluid from the clutch pressure control valve 80 may be supplied through the supply oil path 84. The discharge oil path 85 may discharge the working fluid via the flow rate control valve 82. In addition, to the lock-up control valve 81 may be coupled an apply oil path 86 in communication with the apply chamber 75, and a release oil path 87 in communication with the release chamber 76.

When engaging the lock-up clutch 70, an unillustrated spool valve stem of the lock-up control valve 81 serving as an oil path switching valve may be controlled to an engagement position. Thus, the supply oil path 84 and the apply oil path 86 may be coupled via the lock-up control valve 81, and the discharge oil path 85 and the release oil path 87 may be coupled via the lock-up control valve 81. By thus controlling the lock-up control valve 81, the working fluid may be supplied to the apply chamber 75 and the working fluid may be discharged from the release chamber 76, as indicated by an arrow FL1 in FIG. 5. Thereafter, when a pressure of the apply chamber 75 increases and a pressure of the release chamber 76 decreases, the lock-up piston 71 may move in a direction approaching the front cover 72 owing to a pressure difference. The pressure of the apply chamber 75 may hereinafter be referred to as an applying pressure. The pressure of the release chamber 76 may hereinafter be referred to as a releasing pressure. Thus, the lock-up piston 71 may be pressed against the front cover 72, and the lock-up clutch 70 may be switched to an engaged state. In other words, in the engaged state of the lock-up clutch 70, the lock-up piston 71 may be engaged with the crankshaft 36 via the front cover 72.

In contrast, when disengaging the lock-up clutch 70, the spool valve stem of the lock-up control valve 81 may be controlled to a disengagement position. Thus, the supply oil path 84 and the release oil path 87 may be coupled via the lock-up control valve 81, and the discharge oil path 85 and the apply oil path 86 may be coupled via the lock-up control valve 81. By thus controlling the lock-up control valve 81, the working fluid may be supplied to the release chamber 76 and the working fluid may be discharged from the apply chamber 75, as indicated by an arrow FL2 in FIG. 5. Thereafter, when the applying pressure decreases and the releasing pressure increases, the lock-up piston 71 may move in a direction away from the front cover 72 owing to a pressure difference. Thus, the lock-up piston 71 may be separated from the front cover 72, and the lock-up clutch 70 may be switched to a disengaged state. Note that the lock-up clutch 70 may be switched depending on the vehicle speed. For example, the lock-up clutch 70 may be switched to the engaged state when the vehicle speed is greater than a predetermined value, whereas the lock-up clutch 70 may be switched to the disengaged state when the vehicle speed is equal to or less than the predetermined value.

[Lock-Up Damper]

Figure 6:
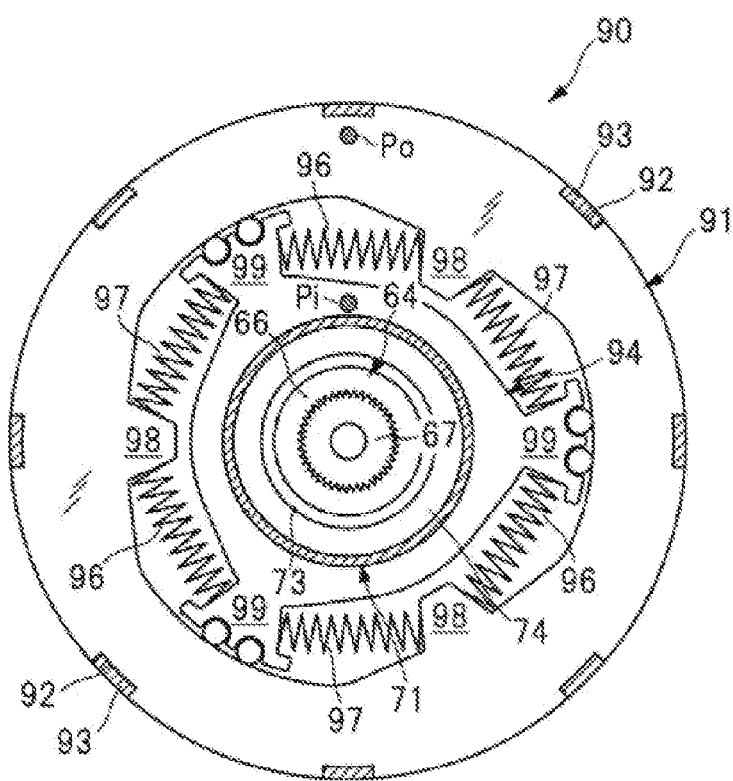
FIG. 6 is a diagram illustrating portions of a lock-up damper and a lock-up piston along line A-A in FIG. 4.

The torque converter 15 may include a lock-up damper 90. In one embodiment, the lock-up damper 90 may serve as a "damper mechanism". The lock-up damper 90 may be provided on a torque transmission path in a state in which the lock-up clutch is engaged. FIG. 6 is a diagram illustrating portions of the lock-up damper 90 and the lock-up piston 71 along line A-A in FIG. 4. As illustrated in FIGS. 4 to 6, the lock-up damper 90 may include an outer plate 91 coupled to the lock-up piston 71. The outer plate 91 may have an outer circumference provided with multiple grooves 92, and the lock-up piston 71 may have an outer circumference provided with multiple claws 93. The lock-up piston 71 and the outer plate 91 may be coupled to each other by engaging the claws 93 of the lock-up piston 71 with the grooves 92 of the outer plate 91.

The lock-up damper 90 may also include an inner plate 94 coupled to the turbine shaft 67 via the turbine hub 64. The turbine hub 64 and the inner plate 94 may be coupled to each other using multiple pin members 95. The lock-up damper 90 may further include multiple coil springs 96 and 97 arranged in a circumferential direction. The coil springs 96 and 97 may each have one end in contact with an inner projection 98 of the outer plate 91, and the coil springs 96 and 97 may each have another end in contact with an outer projection 99 of the inner plate 94. In other words, the coil springs 96 and 97 may be provided between the outer plate 91 and the inner plate 94.

In this manner, the inner plate 94 of the lock-up damper 90 may be coupled to the turbine hub 64, and the outer plate 91 of the lock-up damper 90 may be coupled to the lock-up piston 71. In other words, the lock-up damper 90 is coupled to both the turbine hub 64 and the lock-up piston 71. As described above, the lock-up damper 90 may be provided on the torque transmission path in the state in which the lock-up clutch is engaged. For example, when the lock-up clutch 70 is switched to the engaged state, the engine torque may be transmitted from the front cover 72 to the lock-up piston 71. The engine torque transmitted to the lock-up piston 71 may be transmitted from the outer plate 91 of the lock-up damper 90, through the coil springs 96 and 97, to the inner plate 94. Thereafter, the engine torque transmitted to the inner plate 94 of the lock-up damper 90 may be transmitted, through the turbine hub 64, to the turbine shaft 67. While the lock-up clutch is engaged, torque transmission between the crankshaft 36 and the turbine shaft 67 may thus be performed via the lock-up damper 90.

Figure 7:
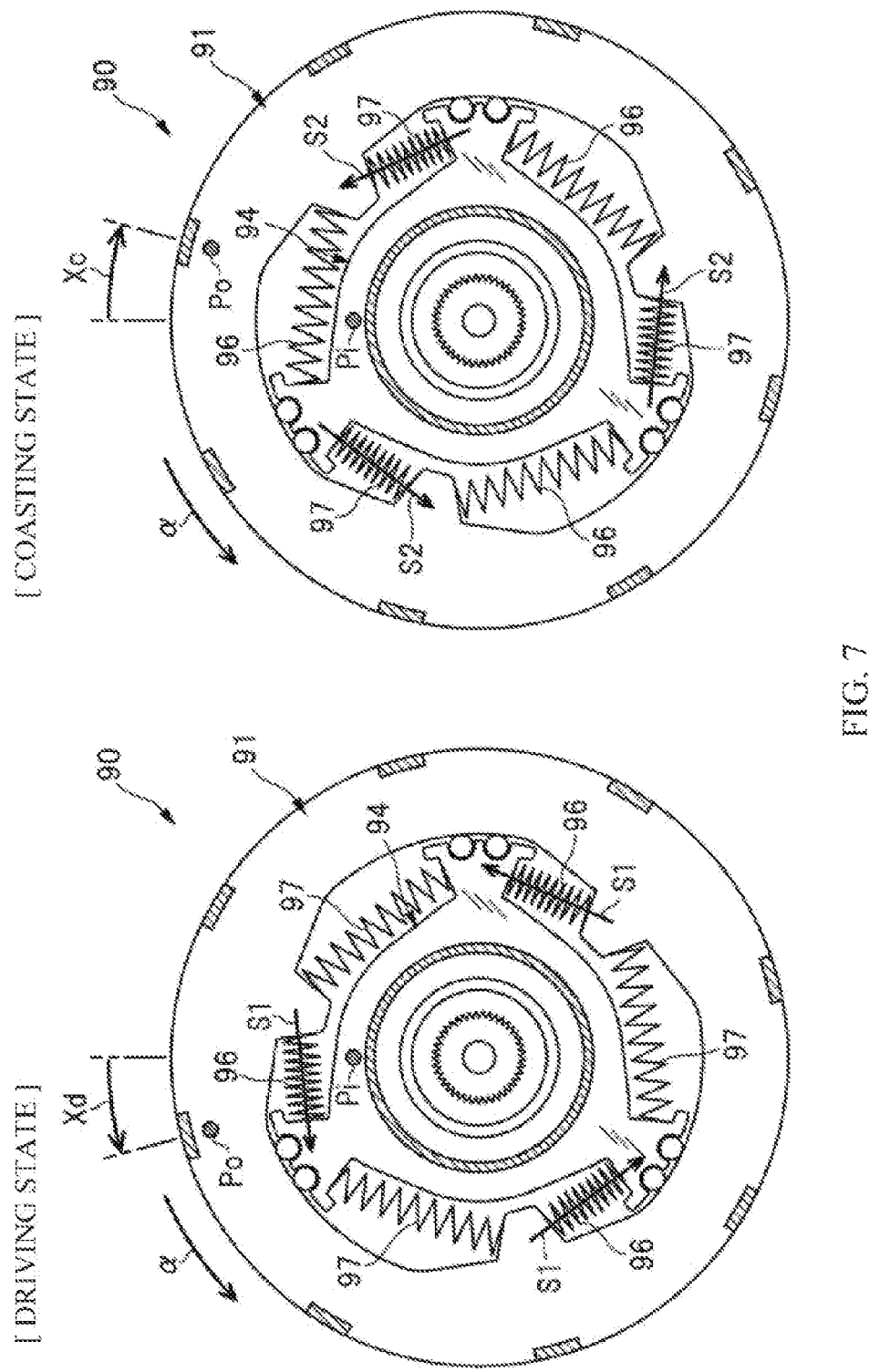
FIG. 7 is a diagram illustrating an example of how the lock-up damper operates.

A description is given next of an operation state of the lock-up damper 90. FIG. 7 is a diagram illustrating an example of how the lock-up damper 90 operates. FIG. 7 illustrates the lock-up damper 90 operating in a driving state and the lock-up damper 90 operating in a coasting state. In FIGS. 6 and 7, a virtual point Po is illustrated as a mark on the outer plate 91, and a virtual point Pi is illustrated as a mark on the inner plate 94, to clarify a relative position between the outer plate 91 and the inner plate 94. Note that an arrow α illustrated in FIG. 7 is an arrow indicating a rotation direction of the outer plate 91 and the inner plate 94.

During acceleration traveling in which the engine torque is increased by depressing the accelerator pedal, torque may be transmitted from the crankshaft 36 toward the turbine shaft 67. Thus, as indicated by an arrow S1 in the driving state of FIG. 7, torque may be transmitted from the outer plate 91 to the inner plate 94 via the coil springs 96, and the outer plate 91 may accordingly precede the inner plate 94 while compressing the coil springs 96. In such a driving state of the lock-up damper 90, as indicated by an arrow Xd, the outer plate 91 may relatively rotate to a driving side with respect to the inner plate 94. In other words, the lock-up damper 90 may be twisted to the driving side, and relative rotation between the outer plate 91 and the inner plate 94 may be permitted.

In contrast, during deceleration traveling in which the engine torque is reduced by releasing the accelerator pedal, torque may be transmitted from the turbine shaft 67 toward the crankshaft 36. Thus, as indicated by an arrow S2 in the coasting state of FIG. 7, torque may be transmitted from the inner plate 94 to the outer plate 91 via the coil springs 97, and the inner plate 94 may accordingly precede the outer plate 91 while compressing the coil springs 97. In such a coasting state of the lock-up damper 90, as indicated by an arrow Xc, the outer plate 91 may relatively rotate to a coasting side opposite to the driving side with respect to the inner plate 94. In other words, the lock-up damper 90 may be twisted to the coasting side, and relative rotation between the outer plate 91 and the inner plate 94 may be permitted.

[Wear Between Turbine Hub and Lock-Up Piston]

As described above, while the lock-up clutch is engaged, the lock-up damper 90 may operate to the driving state or the coasting state, depending on engine torque fluctuation. In other words, the outer plate 91 and the inner plate 94 may relatively rotate to the driving side or the coasting side, depending on the engine torque fluctuation. The cylindrical part 73 of the lock-up piston 71 may be coupled to the outer plate 91, and the hub 66 of the turbine hub 64 may be coupled to the inner plate 94. Therefore, when the outer plate 91 and the inner plate 94 relatively rotate, the hub 66 and the cylindrical part 73 slidably supported by the hub 66 may relatively rotate.

When the hub 66 and the cylindrical part 73 thus relatively rotate, if a sliding surface pressure or a sliding speed between the hub 66 and the cylindrical part 73 excessively increases, this can promote wear between the outer circumferential surface 66a of the hub 66 and an inner circumferential surface 73a of the cylindrical part 73. Promoting wear between the hub 66 and the cylindrical part 73 can widen a gap between the hub 66 and the cylindrical part 73 and cause the working fluid to circulate, i.e., can cause the working fluid to flow from the apply chamber 75 to the release chamber 76 and cause an increase in a workload of the oil pump 22. In addition, promoting wear between the hub 66 and the cylindrical part 73 can cause the working fluid to flow from the apply chamber 75 to the release chamber 76, and can cause poor engagement of the lock-up clutch 70. Therefore, to suppress wear caused between the hub 66 and the cylindrical part 73, the control system 30 may execute wear suppression control to be described later.

[Wear Suppression Control]

Figure 8:
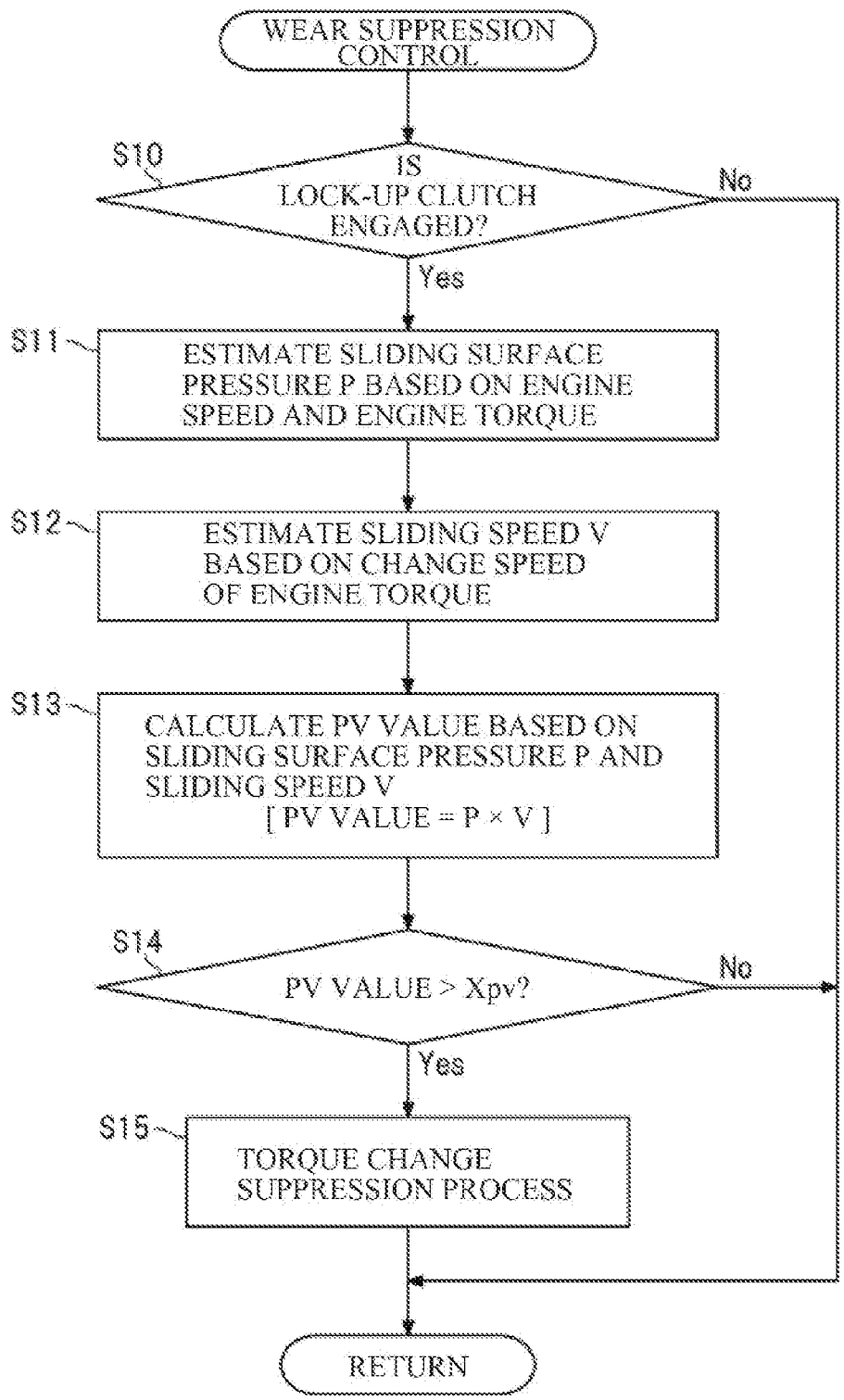
FIG. 8 is a flowchart illustrating an example of an execution procedure of wear suppression control.
Figure 9:
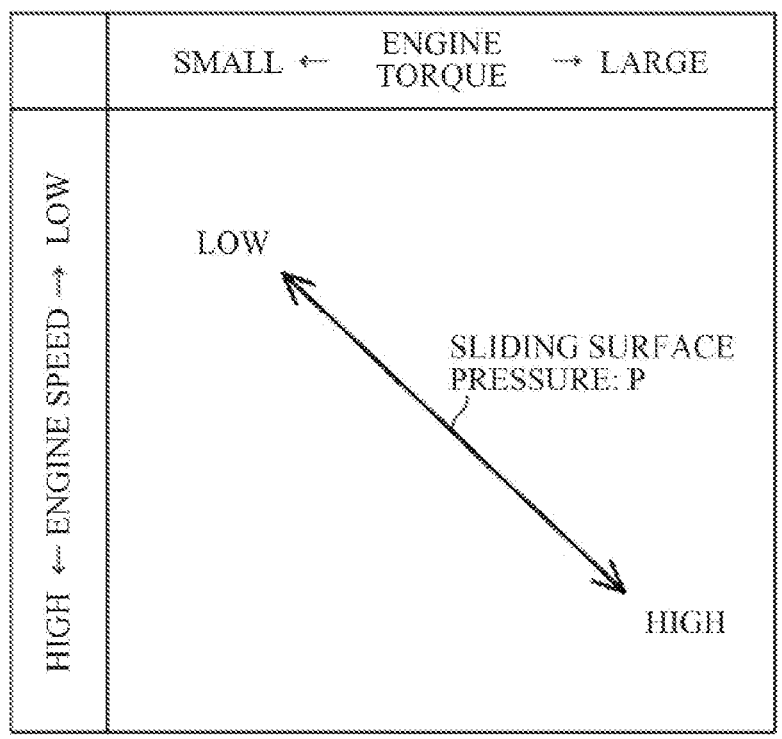
FIG. 9 is a diagram illustrating an example of a sliding surface pressure estimated based on an engine speed and an engine torque.
Figure 10:
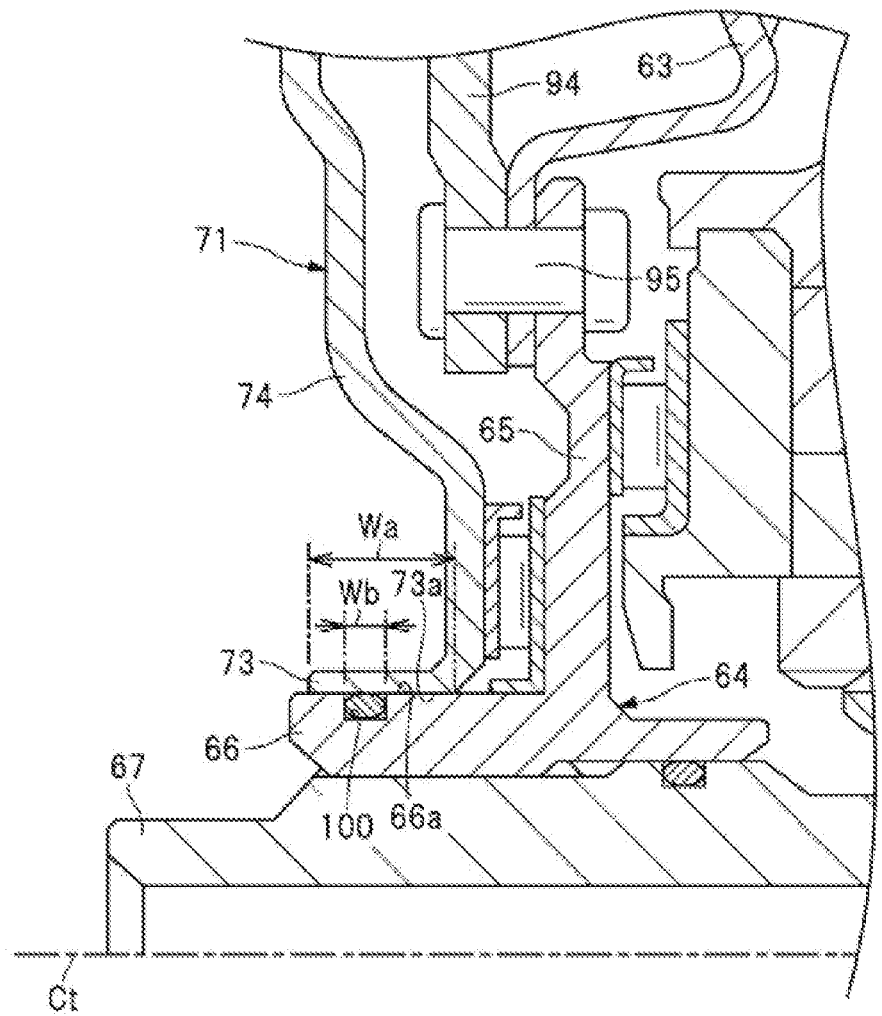
FIG. 10 is a cross-sectional view of a sliding portion between a hub and a cylindrical part and the vicinity thereof.
Figure 11:
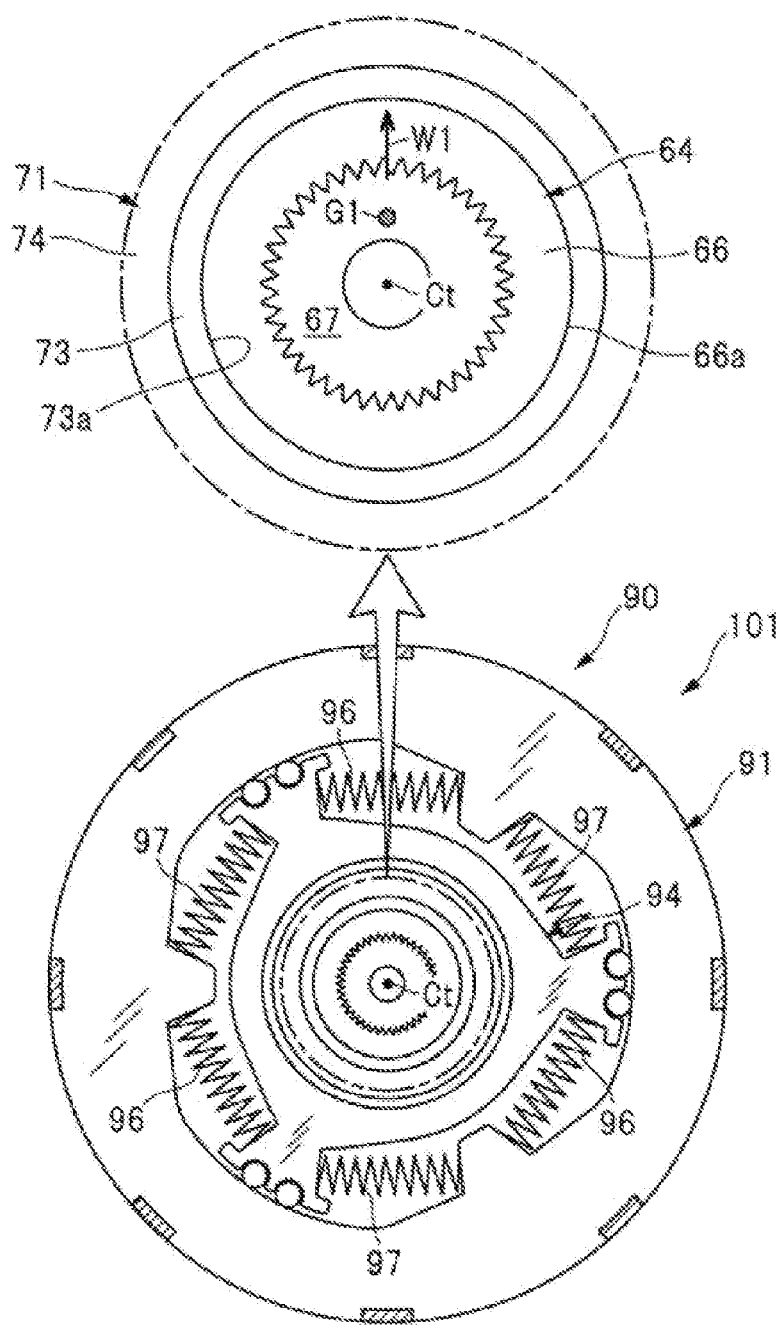
FIG. 11 is a schematic diagram illustrating an example of a load applied to the sliding portion between the hub and the cylindrical part.
Figure 12:
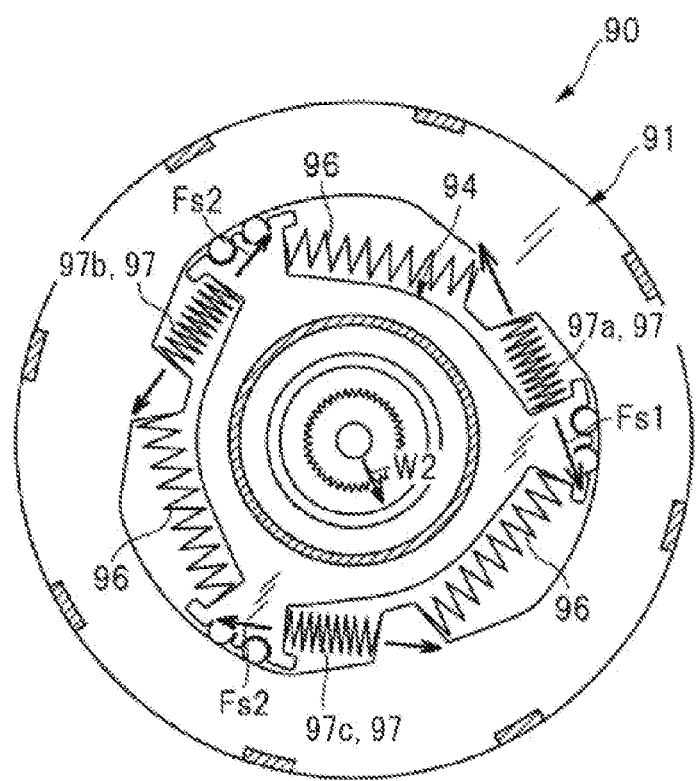
FIG. 12 is a schematic diagram illustrating an example of a load applied to the sliding portion between the hub and the cylindrical part.

FIG. 8 is a flowchart illustrating an example of an execution procedure of the wear suppression control. FIG. 9 is a diagram illustrating an example of a sliding surface pressure P estimated based on the engine speed and the engine torque. FIG. 10 is a cross-sectional view of a sliding portion between the hub 66 and the cylindrical part 73 and the vicinity thereof. FIGS. 11 and 12 are schematic diagrams each illustrating an example of a load applied to the sliding portion between the hub 66 and the cylindrical part 73. Note that each step of the wear suppression control illustrated in FIG. 8 may be performed by the processor 50 in the control system 30. The wear suppression control illustrated in FIG. 8 may be executed by the control system 30 for each predetermined cycle after the control system 30 is started up.

As illustrated in FIG. 8, in step S10, the control system 30 may determine whether the lock-up clutch 70 is engaged. If the control system 30 determines in step S10 that the lock-up clutch 70 is engaged (step S10: Yes), the control system 30 may cause the flow to proceed to step S11, and estimate the sliding surface pressure P between the hub 66 and the cylindrical part 73, based on the engine speed and the engine torque. For example, as illustrated in FIG. 9, the control system 30 may estimate the sliding surface pressure P higher as the engine speed becomes higher, and estimate the sliding surface pressure P higher as the engine torque becomes larger. The sliding surface pressure P may be a surface pressure applied to the sliding portion between the hub 66 and the cylindrical part 73, and may be a surface pressure calculated based on contact between two parallel cylinders in the Hertzian contact theory. In other words, the sliding surface pressure P may be a surface pressure calculated based on the Hertzian contact theory by using a radial load applied to the sliding portion between the hub 66 and the cylindrical part 73, a curvature radius of the outer circumferential surface 66a of the hub 66, a curvature radius of the inner circumferential surface 73a of the cylindrical part 73, a Poisson's ratio, a Young's modulus, and a contact width between the hub 66 and the cylindrical part 73. Used as the contact width between the hub 66 and the cylindrical part 73 may be, for example, as illustrated in FIG. 10, a width (Wa−Wb) obtained by subtracting a width Wb of an O-ring groove 100 from a width Wa of a portion where the hub 66 and the cylindrical part 73 are opposed to each other.

Examples of the radial load applied to the sliding portion may include a first radial load W1 determined by an eccentricity of a rotator assembly 101 including the lock-up piston 71, the lock-up damper 90, and the turbine runner 63. As illustrated in FIG. 11, when a center of gravity G1 of the rotator assembly 101 is deviated from a rotation center Ct, the first radial load W1 is caused in the radial direction on the rotator assembly 101. A magnitude of the first radial load W1 may be determined by the eccentricity and a rotation speed of the rotator assembly 101. The eccentricity of the rotator assembly 101 mass-produced is within a predetermined design range, and the control system 30 is accordingly able to estimate the first radial load W1 based on the engine speed that is the rotation speed of the rotator assembly 101. In other words, because the first radial load W1 becomes larger as the engine speed becomes higher, the control system 30 may estimate the sliding surface pressure P higher as the engine speed becomes higher.

Examples of the radial load applied to the sliding portion may also include a second radial load W2 determined by a variation between the coil springs 96 and 97 in the lock-up damper 90. As illustrated in FIG. 12, when there is a variation in spring force of the coil spring 97, the second radial load W2 is caused in the radial direction on the inner plate 94. For example, when a spring force Fs1 of a coil spring 97a is larger than spring forces Fs2 of other coil springs 97b and 97c, the spring force applied to the inner plate 94 gets out of balance, and the second radial load W2 is thus caused on the inner plate 94. The variation in the spring force related to the coil springs 96 and 97 mass-produced is within a predetermined design range, and the control system 30 is accordingly able to estimate the second radial load W2 based on the engine torque that causes the coil springs 96 and 97 to expand and contract. In other words, because the second radial load W2 becomes larger as the engine torque becomes larger, the control system 30 may estimate the sliding surface pressure P higher as the engine torque becomes larger.

Figure 13:
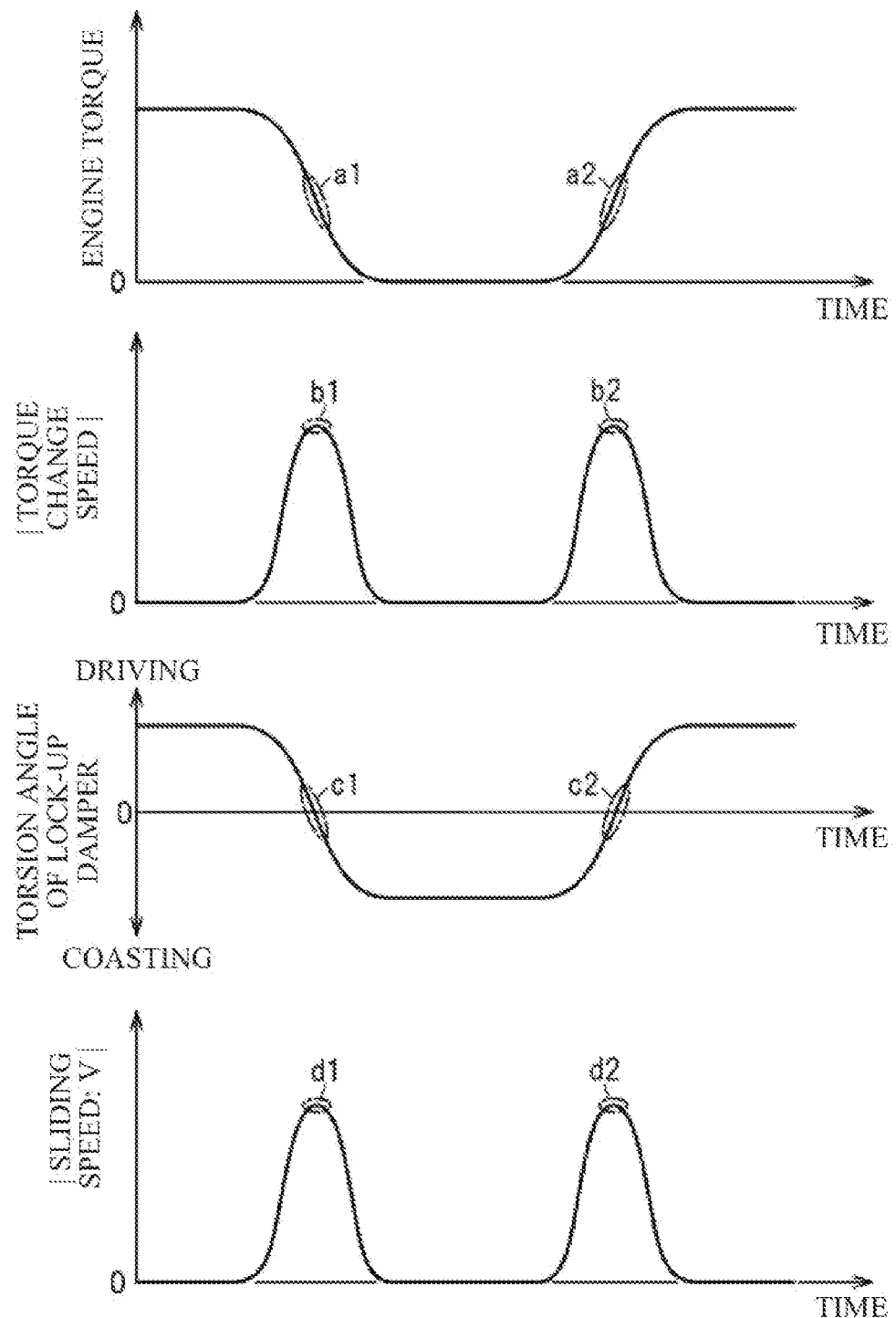
FIG. 13 is a diagram illustrating an example of a relationship between the engine torque and the sliding speed.

As illustrated in the flowchart of FIG. 8, when the control system 30 estimates the sliding surface pressure P based on the engine speed and the engine torque in step S11, the control system 30 may cause the flow to proceed to step S12, and estimate a sliding speed V between the hub 66 and the cylindrical part 73 based on a change speed of the engine torque. FIG. 13 is a diagram illustrating an example of a relationship between the engine torque and the sliding speed V. As illustrated in FIG. 13, when the engine torque decreases (denoted by a reference sign a1), an absolute value of the change speed of the engine torque increases (denoted by a reference sign b1). The change speed of the engine torque may hereinafter be referred to as a torque change speed. When the engine torque thus decreases, the lock-up damper 90 is twisted to the coasting side (denoted by a reference sign c1), and an absolute value of a torsion speed of the lock-up damper 90, i.e., an absolute value of the sliding speed V between the hub 66 and the cylindrical part 73 increases (denoted by a reference sign d1). Further, when the engine torque increases (denoted by a reference sign a2), the absolute value of the torque change speed increases (denoted by a reference sign b2). When the engine torque thus increases, the lock-up damper 90 is twisted to the driving side (denoted by a reference sign c2), and the absolute value of the sliding speed V between the hub 66 and the cylindrical part 73 increases (denoted by a reference sign d2). Therefore, the control system 30 may estimate the sliding speed V higher as the torque change speed resulting from an increase or decrease in the engine torque becomes higher.

When the control system 30 estimates the sliding surface pressure P in step S11 and estimates the sliding speed V in step S12 as described above, the control system 30 may cause the flow to proceed to step S13, and calculate a PV value that is a product of the sliding surface pressure P and the sliding speed V. In subsequent step S14, the control system 30 may determine whether the PV value is greater than a predetermined threshold Xpv. If the control system 30 determines in step S14 that the PV value is greater than the threshold Xpv (step S14: Yes), the current situation is a situation in which wear between the hub 66 and the cylindrical part 73 greatly proceeds, and the control system 30 may accordingly cause the flow to proceed to step S15, and execute a torque change suppression process for the engine 12. In other words, the current situation is a situation in which the sliding surface pressure P or the sliding speed V is high, and is a situation that promotes wear between the hub 66 and the cylindrical part 73. Therefore, the control system 30 may execute the torque change suppression process of gradually changing the engine torque. If the control system 30 determines in step S14 that the PV value is equal to or less than the threshold Xpv (step S14: No), the current situation is a situation in which wear between the hub 66 and the cylindrical part 73 is suppressed, and the control system 30 may accordingly exit the routine without executing the torque change suppression process.

[Torque Change Suppression Process]

Figure 14:
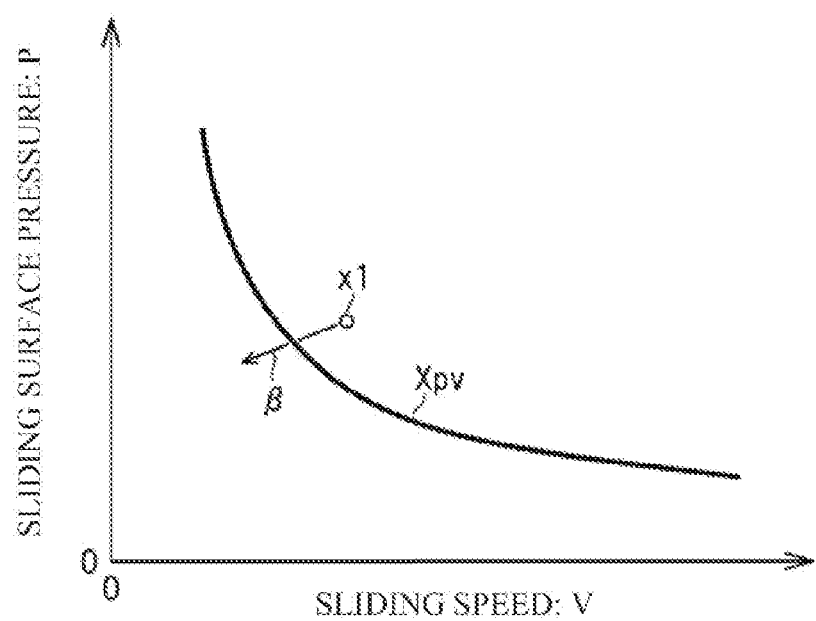
FIG. 14 is a diagram illustrating an example of a threshold to be compared with a PV value.

FIG. 14 is a diagram illustrating an example of the threshold Xpv to be compared with the PV value. As indicated by a reference sign x1 in FIG. 14, in a region where the PV value is greater than the threshold Xpv, the sliding surface pressure P or the sliding speed V between the hub 66 and the cylindrical part 73 is high, which can promote wear between the hub 66 and the cylindrical part 73. Therefore, when increasing or reducing the engine torque in a situation in which the PV value is greater than the threshold Xpv, the torque change suppression process of gradually changing the engine torque is executed. As will be described later, executing the torque change suppression process makes it possible to suppress an excessive increase in the sliding speed V, and to suppress an excessive increase in the PV value. In other words, an excessive increase in the sliding speed V is suppressed to reduce the PV value, as indicated by an arrow β in FIG. 14.

Figure 15:
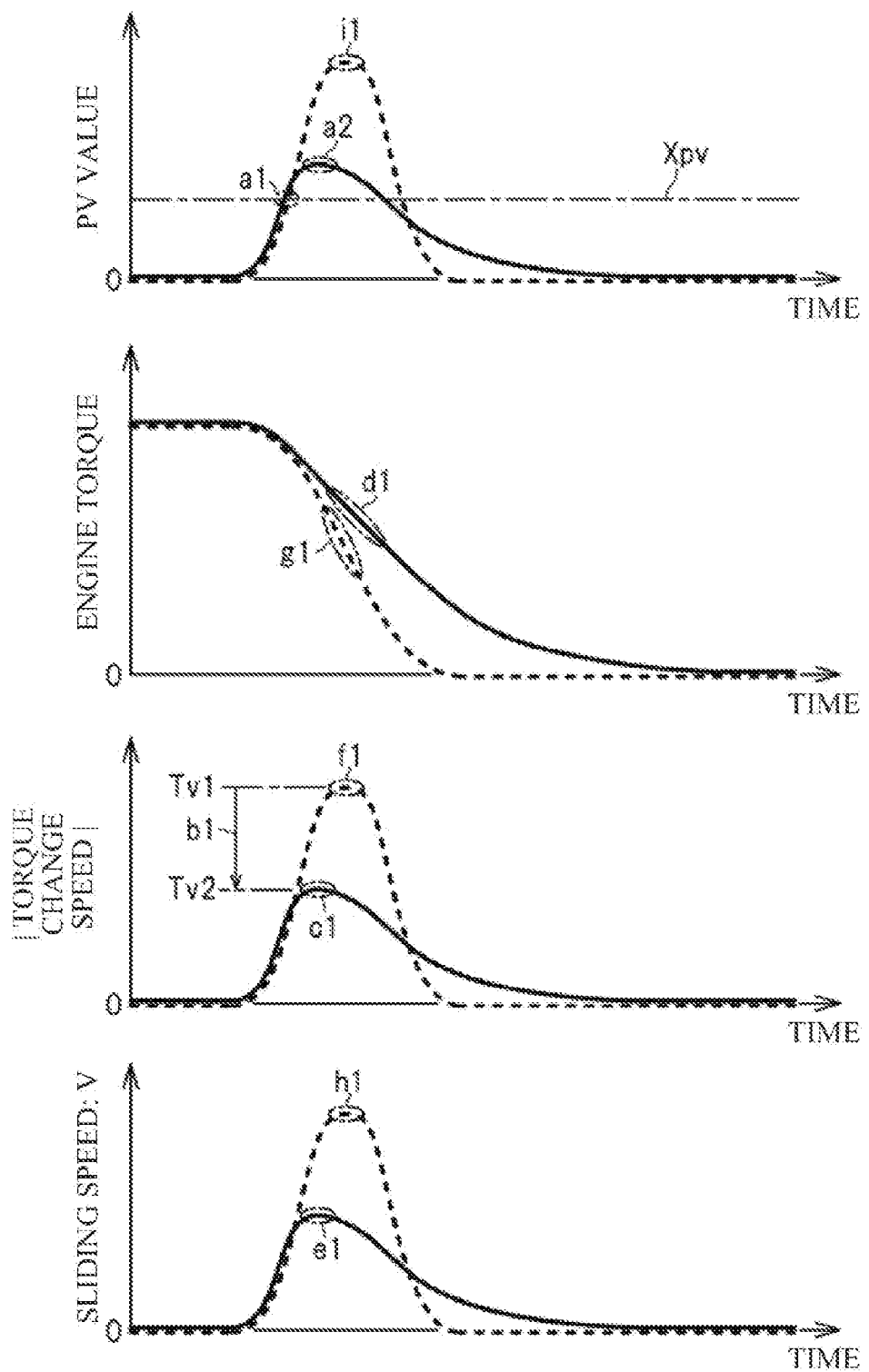
FIG. 15 is a diagram illustrating an example of how a torque change suppression process is executed.

FIG. 15 is a diagram illustrating an example of how the torque change suppression process is executed. FIG. 15 illustrates a situation in which the PV value exceeds the threshold Xpv in the course of a decrease in the engine torque. In FIG. 15, solid lines indicate transition of the engine torque, etc. in an example in which the torque change suppression process is executed, and dashed lines indicate transition of the engine torque, etc. in a comparative example in which the torque change suppression process is not executed.

As indicated by the solid lines in FIG. 15, when the PV value exceeds the threshold Xpv in the course of the decrease in the engine torque (denoted by a reference sign a1), a target decrease speed, i.e., a target change speed, of the engine torque is reduced from a first target speed Tv1 to a second target speed Tv2 (indicated by an arrow b1). In other words, when the PV value is greater than the threshold Xpv, the target change speed of the engine torque may be set lower than when the PV value is equal to or less than the threshold Xpv. The first target speed Tv1 may be the target change speed of the engine torque set when the PV value is equal to or less than the threshold Xpv. The second target speed Tv2 may be the target change speed of the engine torque set when the PV value is greater than the threshold Xpv. By thus reducing the target change speed to the second target speed Tv2 with an increase in the PV value, it is possible to suppress an excessive increase in the torque change speed (denoted by a reference sign c1), and to gradually reduce the engine torque (denoted by a reference sign d1). This makes it possible to suppress an excessive increase in the sliding speed V (denoted by a reference sign e1), and to suppress an excessive increase in the PV value (denoted by a reference sign a2), making it possible to suppress wear between the hub 66 and the cylindrical part 73.

In contrast, as indicated by the dashed lines in FIG. 15, when the engine torque is reduced with the target change speed kept at the first target speed Tv1, the torque change speed excessively increases (denoted by a reference sign f1), and the engine torque abruptly decreases (denoted by a reference sign g1). In this case, the sliding speed V excessively increases (denoted by a reference sign h1), and the PV value excessively increases (denoted by a reference sign i1), which can promote wear between the hub 66 and the cylindrical part 73. As described above, when the PV value is greater than the threshold Xpv, the control system 30 may set the target change speed of the engine torque lower than when the PV value is equal to or less than the threshold Xpv. This makes it possible to suppress an excessive increase in the sliding speed V, i.e., an excessive increase in the PV value, making it possible to suppress wear between the hub 66 and the cylindrical part 73.

[Other Example Embodiments]

Figure 16:
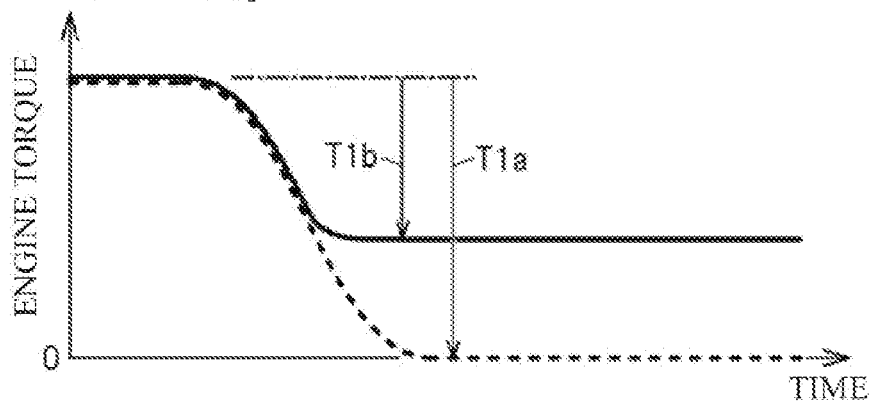
FIG. 16 is a diagram illustrating other control examples in the torque change suppression process.
Figure 16:
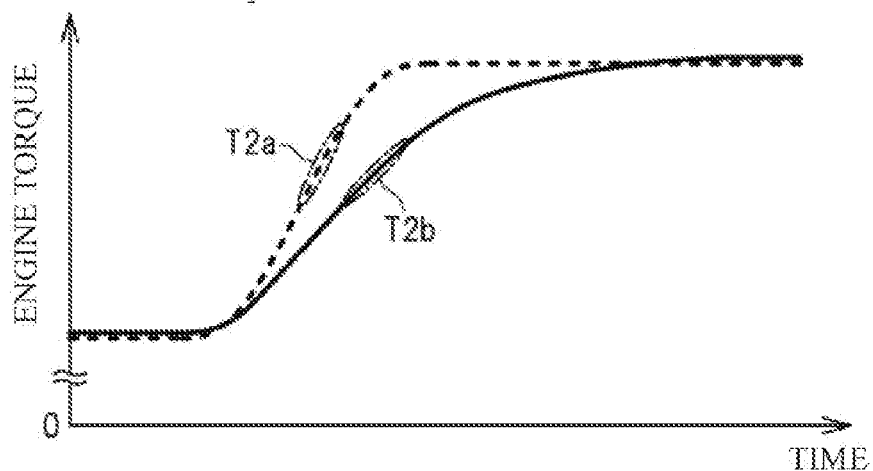
Figure 16:
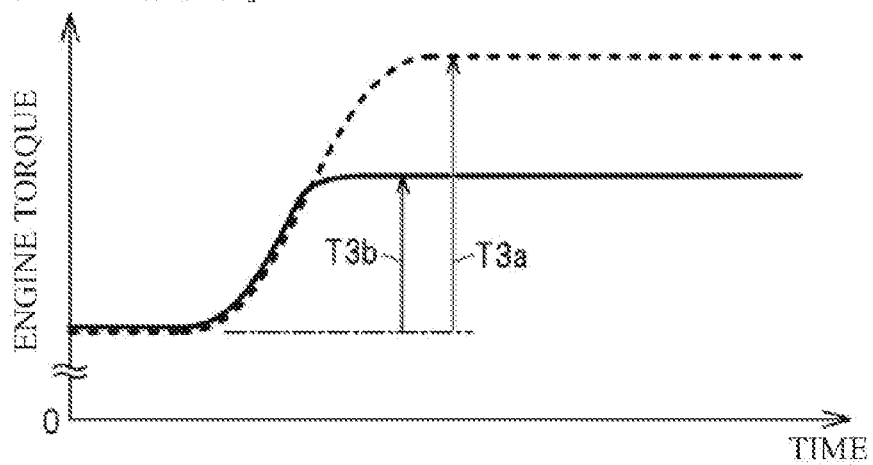

In the above description, the target change speed of the engine torque may be set low in the course of a decrease in the engine torque, as the torque change suppression process, but this is non-limiting. The engine torque may be gradually changed by another control method. FIG. 16 is a diagram illustrating other control examples 1 to 3 in the torque change suppression process. In FIG. 16, solid lines indicate transition of the engine torque in an example in which the torque change suppression process is executed, and dashed lines indicate transition of the engine torque in a comparative example in which the torque change suppression process is not executed.

As represented by the control example 1 in FIG. 16, when reducing the engine torque, a target decrease amount of the engine torque may be set small as the torque change suppression process. The target decrease amount may be an example of a target change amount. For example, when the PV value exceeds the threshold Xpv in the course of a decrease in the engine torque, the target decrease amount of the engine torque may be reduced from a first target decrease amount T1a to a second target decrease amount T1b. In other words, when the PV value is greater than the threshold Xpv, the target decrease amount of the engine torque may be set smaller than when the PV value is equal to or less than the threshold Xpv. Even when the target decrease amount of the engine torque is thus reduced with an increase in the PV value, it is possible to gradually reduce the engine torque. This makes it possible to suppress an excessive increase in the sliding speed V, i.e., an excessive increase in the PV value, making it possible to suppress wear between the hub 66 and the cylindrical part 73. Note that the first target decrease amount T1a may be the target change amount of the engine torque set when the PV value is equal to or less than the threshold Xpv, and the second target decrease amount T1b may be the target change amount of the engine torque set when the PV value is greater than the threshold Xpv.

As represented by the control example 2 in FIG. 16, when increasing the engine torque, a target increase speed of the engine torque may be set low as the torque change suppression process. The target increase speed may be an example of the target change speed. For example, when the PV value exceeds the threshold Xpv in the course of an increase in the engine torque, the target increase speed of the engine torque may be reduced from a first target speed T2a to a second target speed T2b. In other words, when the PV value is greater than the threshold Xpv, the target increase speed of the engine torque may be set lower than when the PV value is equal to or less than the threshold Xpv. Even when the target increase speed of the engine torque is thus reduced with an increase in the PV value, it is possible to gradually increase the engine torque. This makes it possible to suppress an excessive increase in the sliding speed V, i.e., an excessive increase in the PV value, making it possible to suppress wear between the hub 66 and the cylindrical part 73. Note that the first target speed T2a may be the target change speed of the engine torque set when the PV value is equal to or less than the threshold Xpv, and the second target speed T2b may be the target change speed of the engine torque set when the PV value is greater than the threshold Xpv.

As represented by the control example 3 in FIG. 16, when increasing the engine torque, a target increase amount of the engine torque may be set small as the torque change suppression process. The target increase amount may be an example of the target change amount. For example, when the PV value exceeds the threshold Xpv in the course of an increase in the engine torque, the target increase amount of the engine torque may be reduced from a first target increase amount T3a to a second target increase amount T3b. In other words, when the PV value is greater than the threshold Xpv, the target increase amount of the engine torque may be set smaller than when the PV value is equal to or less than the threshold Xpv. Even when the target increase amount of the engine torque is thus reduced with an increase in the PV value, it is possible to gradually increase the engine torque. This makes it possible to suppress an excessive increase in the sliding speed V, i.e., an excessive increase in the PV value, making it possible to suppress wear between the hub 66 and the cylindrical part 73. Note that the first target increase amount T3a may be the target change amount of the engine torque set when the PV value is equal to or less than the threshold Xpv, and the second target increase amount T3b may be the target change amount of the engine torque set when the PV value is greater than the threshold Xpv.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the above description, the control system 30 may be configured by three control units, but this is non-limiting. The control system 30 may be configured by one control unit, or the control system 30 may be configured by two or four or more control units. Further, in the above description, the lock-up clutch 70 may be engaged based on the vehicle speed, but this is non-limiting. The lock-up clutch 70 may be engaged based on the vehicle speed and a requested driving force.

In the above description, the torque change suppression process may be executed immediately when the PV value exceeds the threshold Xpv, but this is non-limiting. For example, counting may be performed each time the PV value exceeds the threshold Xpv, and the torque change suppression process may be executed when the PV value exceeds the threshold Xpv over a predetermined number of times. Further, in the above description, the threshold Xpv that is a fixed value may be used, but this is non-limiting. For example, the threshold Xpv may be changed based on the sliding speed V, or the threshold Xpv may be changed based on the sliding surface pressure P. Note that, when the engine control unit 28 calculates the engine torque, the engine torque may be calculated based on the intake air amount or a fuel injection amount, or the engine torque may be calculated based on an angular acceleration of the crankshaft 36. In another example, a torque sensor that detects distortion of a rotation shaft may be used to calculate the engine torque based on the distortion of the rotation shaft.

According to an embodiment of the disclosure, in a state in which the lock-up piston is engaged with the crankshaft of the engine, the control system calculates the PV value that is the product of the sliding surface pressure and the sliding speed between the hub and the cylindrical part, and when the PV value is greater than the threshold, changes the engine torque more gradually than when the PV value is equal to or less than the threshold. This makes it possible to suppress wear between the lock-up piston and the turbine hub.

The control system 30 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control system 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control system 30 illustrated in FIGS. 1 and 2.

The invention claimed is:

1. A vehicle control apparatus to be applied to a vehicle, the vehicle comprising a torque converter and an engine, the torque converter comprising a turbine runner and a turbine shaft, the engine comprising a crankshaft coupled to the torque converter, the vehicle control apparatus comprising:
   a turbine hub comprising
      a flange coupled to the turbine runner, and
      a hub coupled to the turbine shaft;
   a lock-up piston comprising
      a cylindrical part slidably supported by an outer circumferential surface of the hub, and
      a disc part extending from the cylindrical part outward in a radial direction of the cylindrical part;
   a damper mechanism coupled to both the turbine hub and the lock-up piston, and configured to permit relative rotation between the hub and the cylindrical part; and
   a control system comprising a processor and a memory that are communicably coupled to each other, the control system being configured to control the engine, wherein
   the control system is configured to
   calculate, in a state in which the lock-up piston is engaged with the crankshaft of the engine, a PV value that is a product of a sliding surface pressure and a sliding speed between the hub and the cylindrical part, and
   when the PV value is greater than a threshold, change an engine torque more gradually than when the PV value is equal to or less than the threshold, the engine torque being an output torque of the crankshaft.

2. The vehicle control apparatus according to claim 1, wherein the control system is configured to
   estimate the sliding surface pressure based on an engine speed and the engine torque, the engine speed being a rotation speed of the crankshaft, and
   estimate the sliding speed based on a change speed of the engine torque.

3. The vehicle control apparatus according to claim 2, wherein the control system is configured to
   estimate the sliding surface pressure higher as the engine speed becomes higher,
   estimate the sliding surface pressure higher as the engine torque becomes larger, and
   estimate the sliding speed higher as the change speed of the engine torque becomes higher.

4. The vehicle control apparatus according to claim 3, wherein the control system is configured to, when the PV value is greater than the threshold, set a target change speed of the engine torque lower than when the PV value is equal to or less than the threshold.

5. The vehicle control apparatus according to claim 3, wherein the control system is configured to, when the PV value is greater than the threshold, set a target change amount of the engine torque smaller than when the PV value is equal to or less than the threshold.

6. The vehicle control apparatus according to claim 2, wherein the control system is configured to, when the PV value is greater than the threshold, set a target change speed of the engine torque lower than when the PV value is equal to or less than the threshold.

7. The vehicle control apparatus according to claim 2, wherein the control system is configured to, when the PV value is greater than the threshold, set a target change amount of the engine torque smaller than when the PV value is equal to or less than the threshold.

8. The vehicle control apparatus according to claim 1, wherein the control system is configured to, when the PV value is greater than the threshold, set a target change speed of the engine torque lower than when the PV value is equal to or less than the threshold.

9. The vehicle control apparatus according to claim 1, wherein the control system is configured to, when the PV value is greater than the threshold, set a target change amount of the engine torque smaller than when the PV value is equal to or less than the threshold.

10. A vehicle control apparatus to be applied to a vehicle, the vehicle comprising a torque converter and an engine, the torque converter comprising a turbine runner and a turbine shaft, the engine comprising a crankshaft coupled to the torque converter, the vehicle control apparatus comprising:
- a turbine hub comprising
  - a flange coupled to the turbine runner, and
  - a hub coupled to the turbine shaft;
- a lock-up piston comprising
  - a cylindrical part slidably supported by an outer circumferential surface of the hub, and
  - a disc part extending from the cylindrical part outward in a radial direction of the cylindrical part;
- a damper mechanism coupled to both the turbine hub and the lock-up piston, and configured to permit relative rotation between the hub and the cylindrical part; and
- circuitry configured to control the engine, wherein the circuitry is configured to calculate, in a state in which the lock-up piston is engaged with the crankshaft of the engine, a PV value that is a product of a sliding surface pressure and a sliding speed between the hub and the cylindrical part, and when the PV value is greater than a threshold, change an engine torque more gradually than when the PV value is equal to or less than the threshold, the engine torque being an output torque of the crankshaft.

* * * * *